United States Patent [19]
Kaguma et al.

[11] Patent Number: 6,106,658
[45] Date of Patent: *Aug. 22, 2000

[54] METHOD AND APPARATUS FOR PRODUCING LAMINATE BOARD

[75] Inventors: Noriaki Kaguma; Atsuo Tanaka; Hiroyuki Iwashita; Yoshiki Sakamoto; Hiroshi Inazawa, all of Kudamatsu, Japan

[73] Assignee: Toyo Kohan Co. Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/849,352
[22] PCT Filed: Dec. 8, 1995
[86] PCT No.: PCT/JP95/02519
   § 371 Date: Nov. 25, 1997
   § 102(e) Date: Nov. 25, 1997
[87] PCT Pub. No.: WO96/17721
   PCT Pub. Date: Jun. 13, 1996

[30] Foreign Application Priority Data

Dec. 9, 1994 [JP] Japan .................................. 6-331963

[51] Int. Cl.$^7$ .................................................. B32B 31/20
[52] U.S. Cl. ....................... 156/309.9; 156/311; 156/555; 156/324
[58] Field of Search ................................ 156/309.9, 311, 156/555, 324

[56] References Cited

U.S. PATENT DOCUMENTS

| | | | |
|---|---|---|---|
| 3,959,567 | 5/1976 | Bradley | 156/555 |
| 5,110,387 | 5/1992 | Jasinski et al. | 156/309.9 |
| 5,330,605 | 7/1994 | Tanaka et al. | 156/322 |
| 5,679,200 | 10/1997 | Newcomb et al. | 156/322 |

FOREIGN PATENT DOCUMENTS 1549824 12/1968 France .

*Primary Examiner*—John J. Gallagher
*Attorney, Agent, or Firm*—Browdy and Neimark

[57] ABSTRACT

A method of producing a laminate board (10) involves the steps of heating a continuous belt-like metallic sheet (2) by a heating furnace (1), laminating a thermoplastic resin film (3) on at least one of the surfaces of the metallic sheet, pressing and passing both of them between a pair of laminate rolls (4 and 5), and thermally bonding the film (3) to the metallic sheet (2), wherein the laminate sheet (10) coming out from between the pair of laminate rolls (4 and 5) is pushed by a deflector roll (6) in a transverse direction so as to bias the travelling direction towards the laminate roll (4) in contact with the film (3). The invention also discloses an apparatus (A) used for his method.

7 Claims, 5 Drawing Sheets

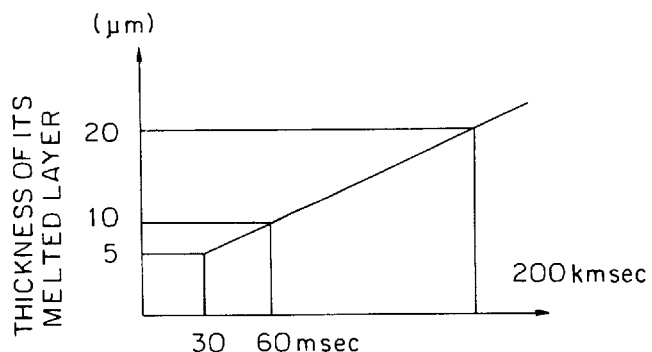
FIG. 3a
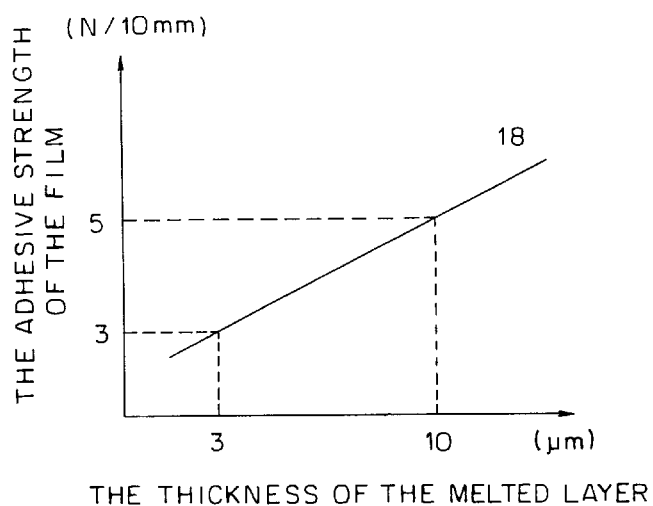
FIG. 3b

METHOD AND APPARATUS FOR PRODUCING LAMINATE BOARD

TECHNICAL FIELD

The present invention relates to a manufacturing method for a laminate sheet and manufacturing apparatus therefor, and more particularly to a manufacturing method for a laminated sheet, in which a thermoplastic resin film is made to contact and be pressed to a heated metal sheet, and a manufacturing apparatus for carrying out the manufacturing method.

BACKGROUND TECHNOLOGY

As shown in FIG. 4, there is a well known laminating method in which a metal sheet 101, heated in an oven, is then made to contact thermoplastic resin films 102, and the metal sheet 101 and resin films 102 are both pressed by a couple of laminating rolls (nip rolls) 103 and 104 while the film 102 is partially melted by the heat of metal sheet 101 to adhere to metal sheet 101 (see Laid-Open Japanese Patent Hei 4-201237, for example). In such a laminating method, the thickness of the melted portion of film 102 (thickness of a melted layer), and the adhering strength of film 102 to the metal sheet 101 can be controlled to some extent by selecting conditions such as heating temperature of metal sheet 101, distance from the oven to laminating rolls 103 and 104, traveling speed of metal sheet 101, and melting temperature of film 102.

In the conventional method mentioned above, as shown in FIG. 5, for example, in the case of laminating an oriented resin film when film 102 is pressed to the metal sheet 101 by laminating rolls 103 and 104 (see FIG. 4), the high temperature of the metal sheet 101 is transferred to the laminating roll 103 of a low temperature through film 102. While the high temperature causes the film 102 to form a melted layer 105, the pressed metal sheet 101 and film 102 adhere to each other. After passing through the nip between laminating rolls 103 and 104, metal sheet 101 is free from pressure, and the film surface is not further cooled, and then the temperature from the metal sheet is transferred to the whole film, which controls the orientation of oriented layer 106 of the film. Therefore, as the traveling speed of metal sheet 101 and film 102 increase, the temperature of the metal sheet should be lowered in order to control the orientation of the oriented layer because the cooling effect by the laminating rolls is not sufficient. For this reason, it is difficult to perform high speed lamination by the conventional laminating method.

On the other hand, as a method to increase the melted layer by high speed lamination, heating metal sheet 101 to a higher temperature may be applied. But in this case, cooling by the laminating rolls does not fully effect cooling of the film 102 so that the melted layer 105 may be formed throughout the whole film thickness, thus reducing the strength of the film. In addition, in a case where the laminate forms a food can and such wholly melted film is located inside of the formed can, and when content is packed and storaged in it, the film is easily cracked by outer impact, which often causes the packed contents to become spoiled.

It is the first object of the present invention to solve the problem in the conventional method and to provide a manufacturing method for a laminated sheet in which the laminated sheet has its adhesion increased, and the sufficiently increased adhesion can be obtained even by high speed lamination. The second object of the present invention is to provide a manufacturing apparatus for such a manufacturing method.

DISCLOSURE OF THE INVENTION

The manufacturing method for a laminate sheet of the present invention is characterized by the steps of: heating a continuous metal sheet; making a thermoplastic resin film contact at least one surface of it; and passing both the metal sheet and the thermoplastic resin film through the nip of a couple of laminate rolls and pressing the sheet and film together, thus thermally bonding the thermoplastic resin film to the metal sheet. It is further characterized by pressing the laminate sheet, which has passed between the laminate rolls, in a transverse direction so as to deviate the traveling direction to either one of the laminate rolls. Furthermore, the method of the present invention is characterized by deviating the traveling direction of the laminate sheet toward the laminating roll which contacts the thermoplastic resin film.

The manufacturing apparatus for a laminate sheet of the present invention is characterized by a heating device for heating a metal sheet, a supplying device for supplying a thermoplastic resin film to be laminated onto at least one side of the heated metal sheet, a couple of laminate rolls for pressing together the metal sheet and the thermoplastic resin film, and a deflector roll for deviating the traveling direction of the laminate sheet which has passed through the nip between the couple of laminate rolls to a direction transverse to the original traveling direction by pushing it aside in the direction of one of the laminate rolls.

The apparatus of the present invention may further comprise a guide roll for making the travelling direction of laminate sheet, which is deviated by the deflector roll, back to the original travelling direction.

The apparatus may also comprise a deflector roll movably arranged in a direction transverse to the traveling direction of the laminate sheet.

Furthermore, the apparatus may effectively comprise a presser or pressure roll for increasing the contact force of the laminate roll and the laminate sheet when the laminate sheet, which has passed through the laminate rolls, is pushed aside to one of the laminate rolls.

When pushing the laminate sheet which has passed between the laminate rolls aside toward one of the laminate rolls, the laminate sheet winds partly around such laminate roll by a certain angle. During traveling the distance corresponding to the arc of that angle, the laminate sheet contacts that laminate roll with some holding strength due to its own tension and in the meantime the laminate sheet is cooled. Therefore, the metal sheet can have its initial temperature selected higher, which permits a melted layer to be thicker during that traveling period. Thus, the thermoplastic resin film and the metal sheet can be more reliably adhered to each other by the pressing force also during that traveling period.

Since the manufacturing apparatus is provided with a deflector roll to deviate the traveling direction of the laminate sheet which has passed between the couple of laminate rolls, it is possible to deviate the traveling direction without causing any resistance to the traveling of the laminate sheet. Apparatus provided with a guide roll to take the deviated traveling direction back to the original direction can easily be combined with a conventional manufacturing line for a laminate sheet. Further, the apparatus provided with the deflector roll movably arranged in a direction transverse to the original traveling direction of the laminate sheet makes it possible to obtain the most preferable thickness of the melted layer of the film depending on the kind of raw material and the traveling speed of the laminate sheet so that the adhesive strength of the film can be improved to thereby prevent subsequent delamination.

BRIEF EXPLANATION OF THE DRAWINGS

FIG. 3(a) is a graph showing the relationship between the period of time during which the film contacts the laminate roll according to the present invention and the thickness of its melted layer, and FIG. 3(b) is a graph showing the relationship between the thickness of the melted layer and the adhesive strength of the film.

THE BEST MODE FOR CARRYING OUT THE INVENTION

Next, the manufacturing method and the manufacturing apparatus for a laminate sheet of the present invention will be explained in more detail referring to each Figure.

Figure 1:
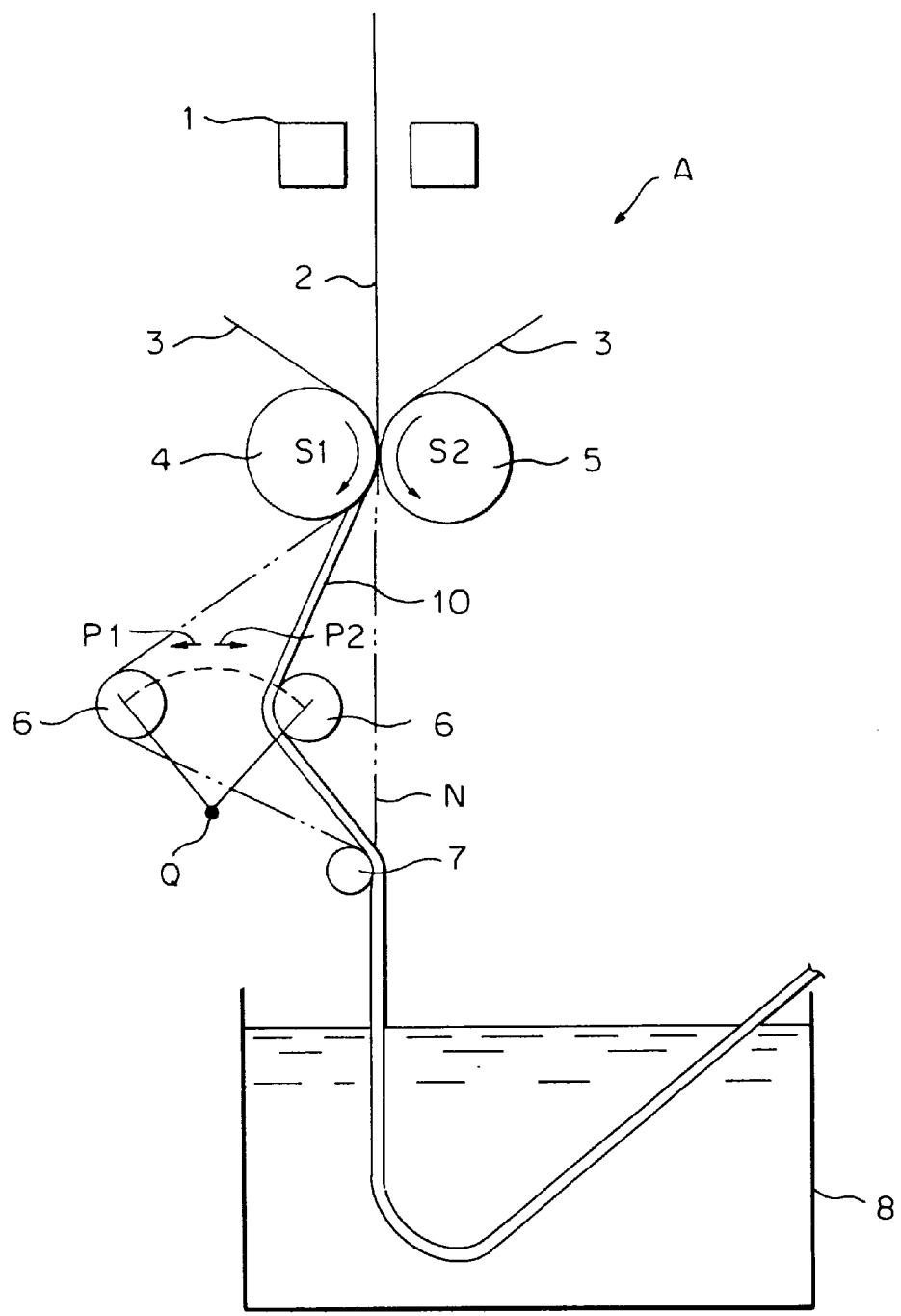
FIG. 1 is a schematic front view showing one example of the manufacturing apparatus for a laminate sheet of the present invention.
Figure 2:
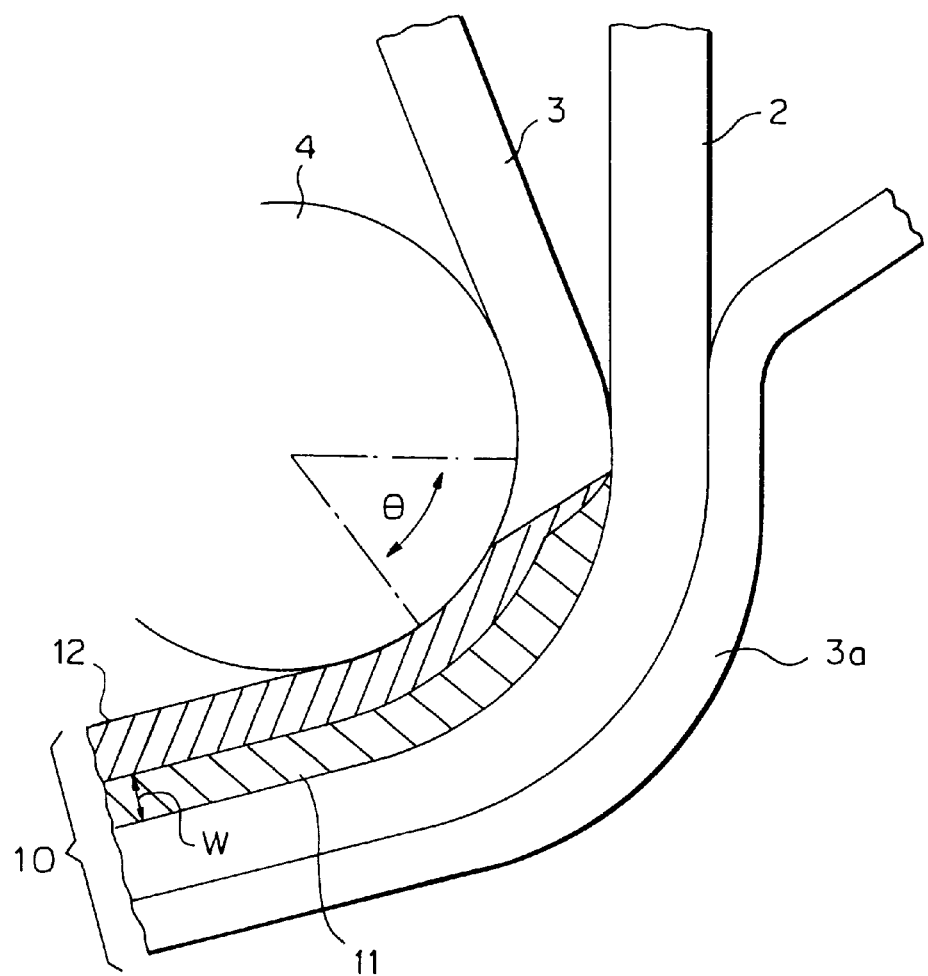
FIG. 2 is a partial cross section of FIG. 1.
Figure 4:
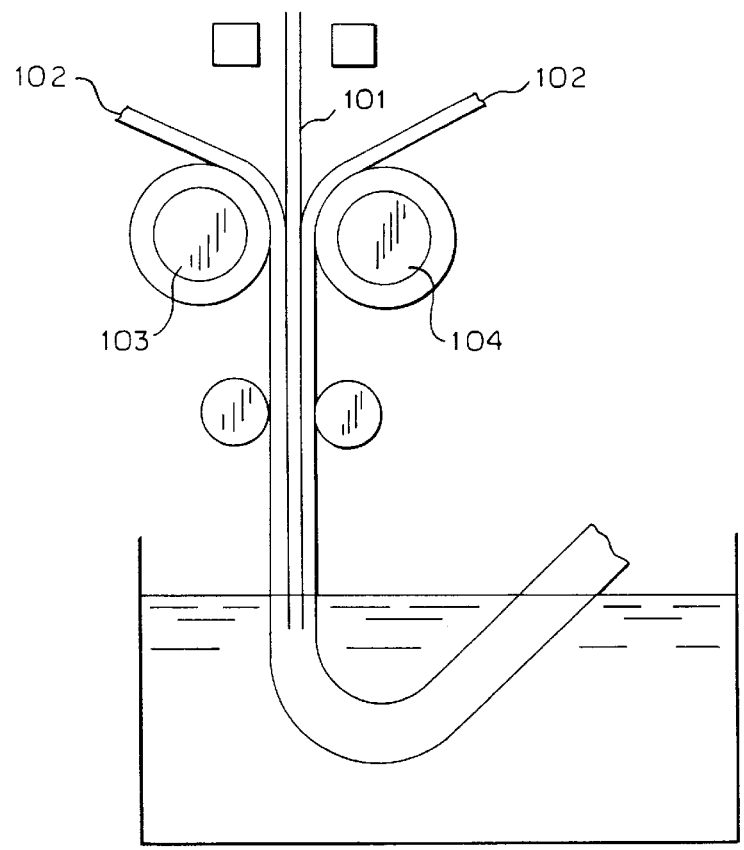
FIG. 4 is a schematic front view showing one example of the conventional manufacturing apparatus.
Figure 5:
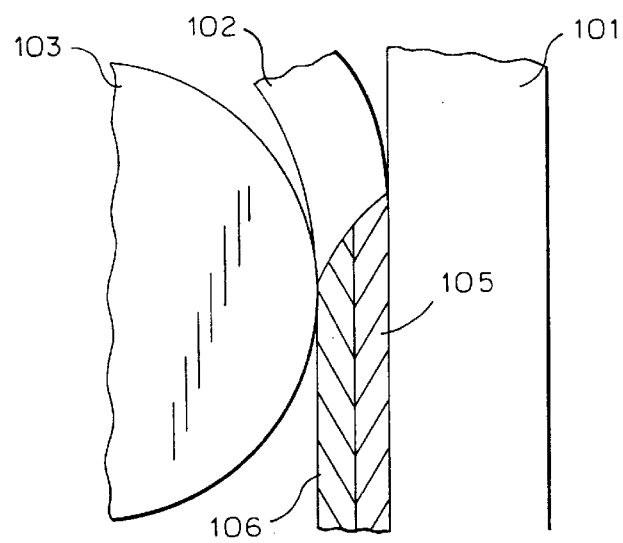
FIG. 5 is a partial cross section of FIG. 4.
Figure 6:
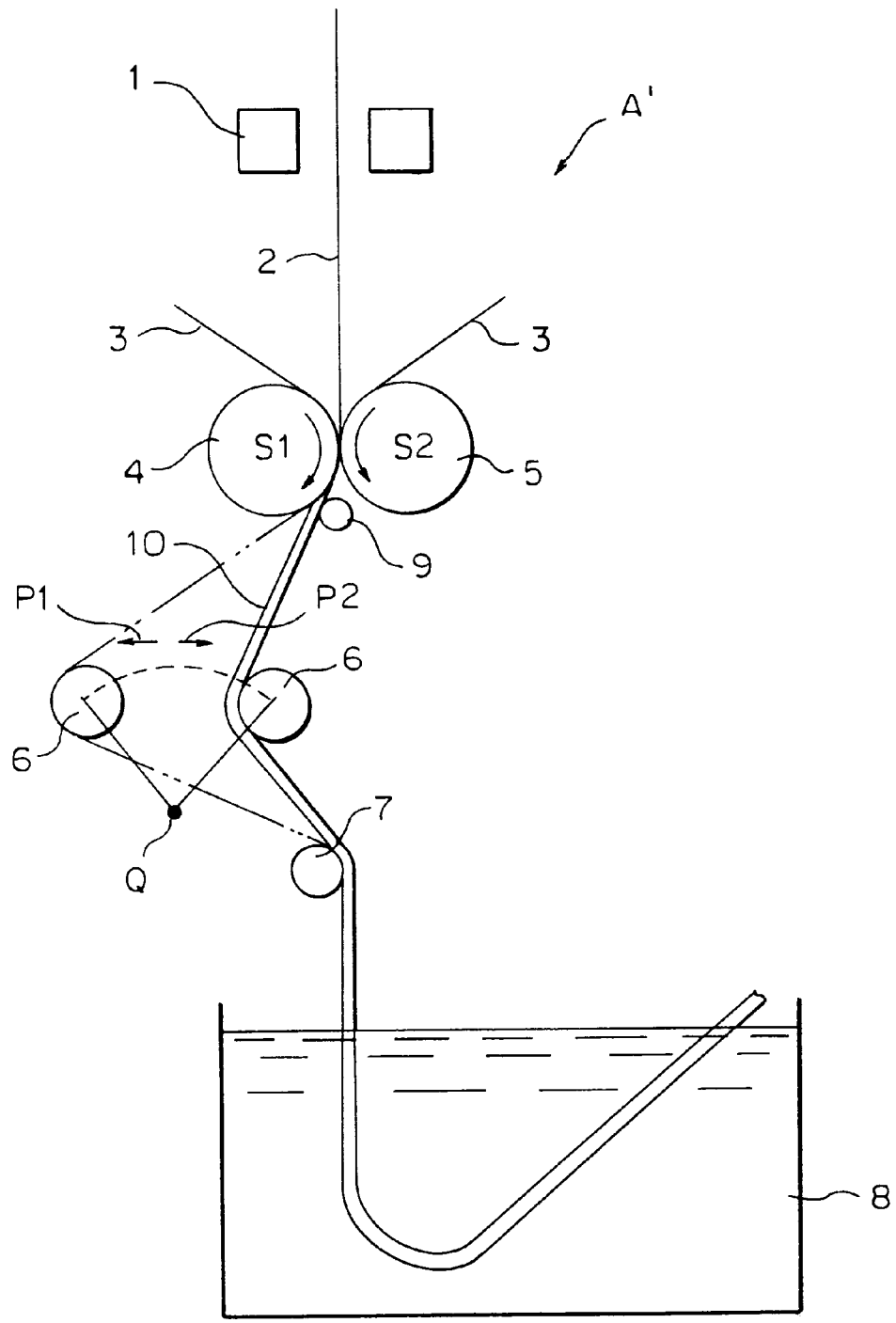
FIG. 6 is a schematic front view showing another example of the manufacturing apparatus of the present invention.

FIG. 1 is a schematic front view showing one example of the manufacturing apparatus of the present invention. FIG. 2 is a partial cross section of FIG. 1. FIG. 3(a) is a graph showing the relationship between the period of time during which the film contacts the laminate roll according to the present invention and the thickness of its melted layer, and FIG. 3(b) is a graph showing the relationship between the thickness of the melted layer and the adhesive strength of the film (after forming). FIG. 6 is a schematic front view showing another example of the manufacturing apparatus of the present invention.

In the manufacturing apparatus A for a laminate sheet shown in FIG. 1, a metal sheet 2 passes through an oven 1 and is heated continuously, and a couple of laminate rolls 4 and 5 arranged below oven 1 serve to press and adhere film 3 to metal sheet 2 coming out from the oven 1. At a short distance below the laminate rolls 4 and 5 is arranged a rotatable deflector roll 6 laterally movable in a direction as shown by arrows P1 and P2. Further below deflector roll 6 is arranged a rotatable guide roll 7. The rotation axes of laminate rolls 4 and 5, deflector roll 6 and guiding roll 7 are parallel to each other. Quenching tank 8 containing a quenching liquid is arranged below guide roll 7.

Manufacturing apparatus A' of FIG. 6 is the one provided with hold down pressure roll 9 for pressing laminate sheet 10 against laminate roll 4 additionally to manufacturing apparatus A. Pressure roll 9 is rotatable and arranged parallel to laminate roll 4.

As oven 1, there can be used a conventionally known one such as a dielectric heating oven. Another heating device such as a heating roll or an induction heating coil can also be used instead of oven 1. The laminate rolls 4 and 5 are prior known ones that act as nip rolls for pinching and pressing metal sheet 2 and film 3 running through the nip between them. Normally, laminate rolls 4 and 5 are each synchronously rotated in opposite directions (arrow S1 and S2) so as to move the laminate sheet 10 downwardly. The distance between the laminate rolls is adjustable and rotation speed can also be controlled.

Deflector roll 6 has its ends rotatably supported by bearings (not shown), and the bearings are each synchronously movable in the directions of arrows P1 and P2 using a control cylinder or the like. The positions of the bearings are normally adjusted according to a predetermined laminating condition, but they may be adjusted during the laminating operation. The deflector roll supporting bearings and thus the deflector roll 6 itself are arranged to move straight and reciprocitively in a lateral direction perpendicular to the surface of the laminate sheet. Such bearings can also be arranged for the deflector roll 6 to rotate about an axis Q which is positioned below (or above) the illustration positions, that is, with the various possible positions of the axes being parallel to one another. The bearings may be positioned as shown by the imaginary line.

Guide roll 7 has its ends supported by bearings (not shown), and the bearings are each fixed to a frame or the like. Guide roll 7 is arranged at such a position as to contact a tangential line N of laminate rolls 4 and 5. Not shown is an additional drive or nip roll to drive the laminate sheet 10 into and out from quenching tank 8. This causes tension on the laminate sheet 10, and thus a proper tension works the laminate sheet 10 located between laminate rolls 4 and 5 and guide roll 7.

The manufacturing apparatus constructed as mentioned above is used as follows. At first, two films 3 and 3 taken out from a supplying device which is not shown are made to contact both sides of the metal sheet that has passed through oven 1, and then the three members are passed through the nip of laminate rolls 4 and 5. Subsequently, the thus produced laminate sheet 10 is passed on the left side of deflector roll 6 which is deviated to the left side from tangential line N shown in FIG. 1, and then it is passed on the right side of guide roll 7, to thereby take the traveling direction back to the original traveling direction. The deviation distance of deflector roll is suitably adjusted according to forming conditions and so on. Further, the laminate sheet 10 is guided downward into quenching tank 8.

As mentioned above, since the laminate sheet 10 coming from laminate rolls 4 and 5 travels in a zigzag line, the laminate sheet 10 winds partly around one laminate roll 4 by a predetermined winding angle (contacting angle) θ. Contacting angle θ becomes larger when deflector roll 6 is deviated to the left illustrated position in FIG. 1, while it becomes smaller when deflector roll 6 is deviated to its right illustrated position. When the deviation becomes "0", the laminate sheet is guided downward straight as is conventional, and winding angle becomes 0.

Thus, a pressing force due to the tension of laminate sheet 10 is worked between film 3 and metal sheet 2 by making laminate sheet 10 contact with one laminate roll 4 by a predetermined winding angle to thereby increase the period for cooling the laminate sheet. Further in the case where the presser roll 9 shown in FIG. 6 is provided, a greater pressing force can be provided therefore increasing further the contact between the roll 4 and the laminate sheet 10, which can additionally improve the cooling effect due to better thermal conduction.

Since an increase of the cooling is due to the increase of the applied pressing force between film 3 and metal sheet 2, it affects not only film 3 which contacts one laminate roll 4 but also film 3a contacting the other side of metal sheet 2 shown by the imaginary line in FIG. 2. The greater pressing force and the longer the period for contacting the laminate roll 4, the more the total mass of thermal conduction increases. Therefore, the initial temperature of metal sheet 2 can be raised due to the increase of the cooling period, and thickness W of melted layer 11 on the side of the film 3 contacting the metal sheet 2 can be increased. The relationship between the contacting period "t" of film 3 to laminate roll 4 and thickness W of melted layer 11 is substantially in direct proportion as shown in FIG. 3a.

As the melted area 11 thickness increases, adhesion of film 3 to metal sheet 2 during forming increases after being cooled. The relationship between them is also substantially in direct proportion as shown in FIG. 3b. In addition to the increase of the melted layer thickness, the increase of the period during which film 3 is pressed to metal sheet 2 multiplicably affects film 3 and its adhesion is more improved.

In the above-mentioned example, the increase of adhesion of film during forming is explained on condition that the laminating speed is the same as that applied in the conventional method. Conversely speaking, if the adhesion obtained by the conventional manufacturing method is deemed sufficient, the laminating can be carried out at a higher speed than is conventional. Furthermore, winding the film round the laminate roll makes the contacting period of laminate sheet 10 to laminate roll 4 longer immediately after the lamination, and the cooling effect by the laminate roll can be fully obtained. Therefore, film 3 does not wholly melt even when metal sheet 2 coming out from the oven is heated to a higher temperature, and the unmelted layer can reliably remain outside. Accordingly, even when the laminating is carried out at a high speed, melted layer 11 having sufficient thickness can be obtained, thus increasing the film adhesion during forming. In this case, the orientation of the film in the unmelted layer is reduced. Between melted layer 11 and slightly oriented layer 12, there exists a thickness zone or layer (not shown) where the degree of orientation gradually decreases from the slightly oriented layer 12 to the melted layer 11.

Next, concrete examples and comparison examples are given and the effect of the manufacturing method of the present invention is explained.

EXAMPLES 1 TO 3

A biaxially oriented polyester thermoplastic resin film having thickness of 25 μm was heat laminated on one side of a strip of electrolytically chromated steel (TFS) having a thickness of 0.2 mm used for can stock using the manufacturing apparatus as shown in FIG. 1. The temperature of the steel strip just before coming to the laminate rolls was about 225° C., and that of the laminate roll spontaneously cooled was about 150° C. The traveling speeds of the laminate sheet were 100, 200 and 400 m/min in Example 1, 2 and 3, respectively. Winding angle for the laminate sheet round the laminate roll was 20° in all examples.

When the laminates thus obtained were formed into a cup having a diameter of 65 mm and a height of 100 mm using a drawability tester, no film crack was caused in any of the examples and 4.0 to 5.6 N/10 mm of stripping force of the film (adhering strength during forming) was required to strip the film in each example. The original orientation of the film determined by measuring the birefringence index was about 0.09, while in the laminated film, the melted layer had the birefringence index of 0.01 and the thickness of about 5 to 15 μm, and the intervening layer had the birefringence index of 0.01 to 0.05 and the thickness of about 3 μm.

COMPARATIVE EXAMPLES 1 TO 3

The laminating operation for Comparative examples 1, 2 and 3 were performed on the same conditions (the traveling speed of the laminate sheet were 100, 200 and 400 m/min, respectively) as in Examples 1–3 except that the laminate sheet was not made to wind round the laminate roll but traveled downward straight. When the laminate sheet of Comparative example 3 was formed into a cup substantially the same as Example 1, a film crack was partially caused. In case of Comparative examples 2 and 3, no film crack was caused, but stripping force of the film (adhering strength during forming) were 4.0 and 2.9 N/10 mm, respectively. The melted layer had a birefringence index of 0.01 and the thickness of about 0 to 5 μm, the slightly oriented layer had a birefringence index of about 0.058 and a thickness of about 20 to 25 μm, and the intervening layer had a birefringence index of 0.01 to 0.05 and a thickness of about 3 μm. The results are shown in Tables 1 and 2.

TABLE 1

| | | Example | | |
|---|---|---|---|---|
| No | Traveling Speed | Thickness of Melted Layer | Thickness of Oriented Layer | Adhering Strength |
| 1 | 100 m/min | 15 μm | 10 μm | 5.6 N/10 mm |
| 2 | 200 m/min | 9 μm | 16 μm | 4.8 N/10 mm |
| 3 | 400 m/min | 5 μm | 20 μm | 4.0 N/10 mm |

TABLE 2

| | | Comparative Example | | |
|---|---|---|---|---|
| No | Traveling Speed | Thickness of Melted Layer | Thickness of Oriented Layer | Adhering Strength |
| 1 | 100 m/min | 5 μm | 20 μm | 4.0 N/10 mm |
| 2 | 200 m/min | 2.5 μm | 22.5 μm | 2.9 N/10 mm |
| 3 | 400 m/min | 0 μm | 25 μm | 0.5 N/10 mm |

From the results shown above, it is apparent that according to the manufacturing method of the present invention, a laminate sheet can be obtained having excellent adhering strength of the film to the metallic sheet and hardly able to be peeled off during subsequent forming, even when the laminate sheet is manufactured at a high speed of 100~400 m/min.

INDUSTRIAL UTILITY

As mentioned above, according to the manufacturing method of the present invention, the adhering strength of the film to a metallic sheet can be improved and it is not reduced even when the laminating operation is performed at a high speed. According to the manufacturing apparatus of the present invention, the above-mentioned manufacturing method can easily be carried out.

SUMMARY

A method of producing a laminate sheet (10) comprises the steps of heating a continuous belt-like metal sheet (2) by a heating furnace (1), laminating a thermoplastic resin film (3)on at least one of the surfaces of the metal sheet, pressing and passing both of them between a pair of laminate rolls (4 and 5), and thermally bonding the film (3) to the metal sheet (2), wherein the laminate sheet (1) coming out from between the pair of laminate rolls (4 and 5) is pushed by a deflector roll (6) in a transverse direction so as to bias the traveling direction towards the laminate roll (4) which contacts film (3). The invention also discloses an apparatus (A) used for this method.

What is claimed is:

1. A manufacturing method for a laminate sheet comprising the steps of:

heating a continuous metal sheet;

laminating thermoplastic resin films on the surfaces of the metal sheet; and passing the composite so formed between a couple of laminate rolls, pressing them, and thermally bonding said films to said metal sheet to provide a laminate sheet, wherein said laminate sheet coming out from between said couple of laminate rolls is pushed aside in a transverse direction so as to bias its traveling direction to either one of said laminate rolls, and to prolong contact of one of the surfaces of said laminate sheet with one of the laminate rolls for increased cooling, and to press said laminate sheet against one of said laminate rolls to provide a greater contacting force between one of said laminate rolls and said laminate sheet so as to improve the cooling effect when said laminate exiting said laminate rolls is pushed aside to one of said laminate rolls.

2. A manufacturing apparatus comprising:

means for supplying and means for heating a metal sheet;

means for supplying thermoplastic resin films to opposite surfaces of said heated metal sheet;

a couple of laminate rolls for pressing said metal sheet and said thermoplastic resin films together to obtain a laminate sheet and for cooling the surfaces of said laminate sheet;

a deflector roll for pushing the laminate sheet, which has passed between said laminate rolls, in a transverse direction so as to bias the traveling direction of the laminate sheet to one of the laminate rolls and provide prolonged contact of one of the surfaces of said laminate sheet with one of the laminate rolls for increased cooling; and a pressure roll for pressing said laminate sheet against said one of said laminate rolls so as to provide a greater contacting force between one of said laminate rolls and said laminate sheet and improve the cooling effect when said laminate sheet which has come out through said laminate rolls is pushed aside to one of said laminate rolls.

3. The manufacturing apparatus according to claim 2 further comprising a guide roll for making said travelling direction of said laminate sheet which is biassed by said deflector roll back to the original travelling direction of said laminate sheet.

4. The manufacturing apparatus according to claim 2, wherein said deflector roll is movably arranged in a direction transverse to said original traveling direction of said laminate sheet.

5. The manufacturing apparatus according to claim 3, wherein said deflector roll is moveably arranged in a direction transverse to said original traveling direction of said laminate sheet.

6. A method for manufacturing a laminate comprising a metallic substrate and first and second oriented plastic films adhered to opposite surfaces of said metallic substrate, said method comprising:

continuously passing a continuous length of metal sheet through a heating device to continuously heat said metal sheet;

continuously passing
(1) a continuous length of said first oriented plastic film adjacent a first laminate roll and into contact with a first surface of said metal sheet and
(2) a continuous length of said second plastic film adjacent a second laminate roll and into contact with a second surface of said metal sheet, and passing said oriented plastic films and heated metal sheet through the nip between said first laminate roll and said second laminate roll, whereby said metal sheet and plastic films are pressed and thermally bonded together to form a laminate of said oriented plastic films and said metallic substrate; and continuously passing said laminate out from between said nip, deflecting the path of said laminate in a transverse direction toward said first laminate roll with a deflector roll to cause the surface of said first oriented plastic film opposite the surface of said first plastic film adhered to said metal sheet to remain in contact with said first laminate roll beyond said nip, and pressing said laminate against said first laminate roll so as to increase the contacting force between said first laminate roll and said laminate and improve the cooling effect when said laminate which has come out through said first and second laminate rolls is deflected to said first laminate roll.

7. A method for manufacturing a laminate comprising a metallic substrate and an oriented plastic film adhered to a surface of said metallic substrate, said method comprising:

continuously passing a continuous length of metal sheet through a heating device to continuously heat said metal sheet;

continuously passing a continuous length of said oriented plastic film adjacent a first laminate roll and into contact with said metal sheet, and passing said oriented plastic film and heated metal sheet through the nip between said first laminate roll and a second laminate roll, whereby said metal sheet and plastic film are pressed and thermally bonded together to form a laminate of said oriented plastic film and said metallic substrate;

continuously passing said laminate out from between said nip and deflecting the path of said laminate in a transverse direction toward said first laminate roll with a deflector roll to cause the surface of said oriented plastic film opposite the surface of said plastic film adhered to said metal sheet to remain in contact with said first laminate roll beyond said nip; and pressing said laminate against said first laminate roll so as to increase the contacting force between said first laminate roll and said laminate and improve the cooling effect when said laminate which has come out through said first and second laminate rolls is pushed aside to said first laminate roll.

* * * * *